July 10, 1934.  M. S. DUNKELBERGER  1,965,796

FISHING ROD

Filed May 28, 1932

INVENTOR
Milton S. Dunkelberger,
BY
Howard S. Smith
His ATTORNEY

Patented July 10, 1934

1,965,796

UNITED STATES PATENT OFFICE 1,965,796

FISHING ROD

Milton S. Dunkelberger, Dayton, Ohio

Application May 28, 1932, Serial No. 614,153

1 Claim. (Cl. 287—119)

This invention relates to new and useful improvements in fishing rods.

It is one of the principal objects of my invention to provide means such as a chuck joint for attaching a handle to a fishing rod in a firm manner without the necessity of gripping a guide on the rod to force it into, or to draw it from the handle socket. Many guides are broken in just this way.

Another object of my invention is to provide split band clips that are adapted to be soldered to a fishing rod to receive the banded guide rings. At present guides are usually provided with feet around which wires are passed and soldered to secure them to the rod. These wires at the places they are wrapped and soldered around the guide feet, form stiff spots to prevent the rod being bent into an even arc. In my construction, on the other hand, the banded guide is sprung and soldered into the split guide clip after the hump end of the latter is soldered to the rod, thus eliminating the objectionable soldered wire attaching means.

It is another object of my invention to provide for the rod, a rubber handle having finger grip portions.

Figure 2:
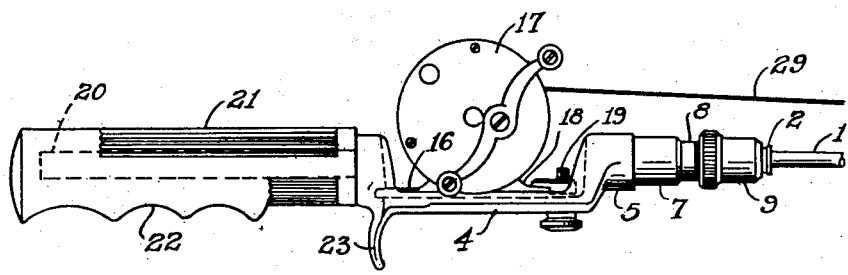
Figure 3:
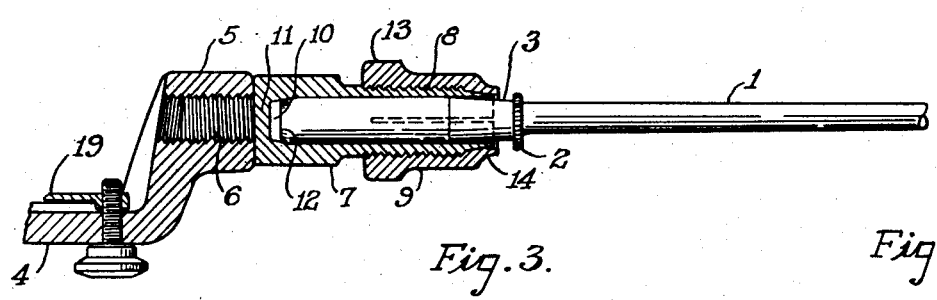
Figure 1:
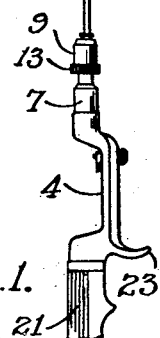

In the accompanying drawing, Figure 1 is a side view of my fishing rod when assembled. Figure 2 is a side view of the handle, reel and the inner end of the rod. Figure 3 is a longitudinal sectional view through the chuck joint mounting for the rod.

Figure 4:
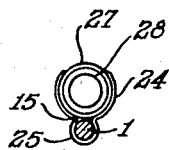
Figure 5:
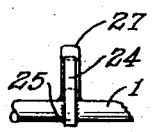
Figure 6:
Figure 7:

Figure 4 is a cross-sectional view taken through the rod, showing the mounting for one of the larger guides. Figure 5 is a side view of the same. Figure 6 is a cross-sectional view taken through the rod, showing a similar mounting for one of the smaller guides. And Figure 7 is a side view thereof.

Referring to the accompanying drawing for a detailed description of the invention, the numeral 1 designates a spring metal rod which tapers radially inward from its rear to its front end.

Near its extreme outer end the rod is formed with an annular shoulder 2 having a serrated edge. Between its outer end and this shoulder the rod is of greater diameter than any part of it in front of the shoulder, being formed with an axially inward tapered portion 3 immediately behind the latter.

The handle which receives the rod 1 will now be described. First, it comprises an offset middle metal member 4 which terminates at its front end in an internally threaded tubular part 5 which receives the reduced threaded end 6 of a cylindrical socket member or chuck 7. The latter terminates at its front end in a reduced, externally threaded, tapering portion 8 which is axially split to provide spring clamping jaws that are adapted to be closed radially inward by a gland nut 9 applied to said threaded portion.

The socket member 7 is formed with an axial bore 10 which, at its rear end, tapers radially inward toward an end web 11 to receive the slightly tapered rear butt end 12 of the rod 1.

The gland nut 9 is formed with an enlarged serrated rear edge portion 13 and a radially inward tapering front end 14 which is adapted to engage and force the clamping jaws of the chuck 7 inwardly when the nut is screwed upon them.

To attach the handle to the rod, the butt portion 12 of the latter is inserted as far as it will go into the tapered end of the bore 10 of the socket member 7 through the gland nut 9 applied to the split end of the latter. The nut is then screwed back over this split end of the socket member to engage the clamping jaws of the latter tightly with the tapered portion 3 of the butt end of the rod until it is locked so tightly to the handle that it cannot rattle. The clamping jaws formed by the split end of the socket member not only grip the tapered neck 3 of the butt end of the rod, but force it farther back into the tapered bore of the chuck.

When it is desired to withdraw the rod from the chuck 7, the gland nut 9 is screwed outwardly until it engages the shoulder 2 on the rod. Thence, while the clamping jaws release their grip upon the butt end of the rod, the outwardly moving gland nut, through its engagement with the shoulder 2, will force the rod out of the socket portion of the handle without the necessity of the rod being gripped at one of the guides, such as the guide 15, and pulled out, with attendant injury to the latter.

At its rear end the offset handle 4 is formed with a recess to receive one foot portion 16 of the support for a reel 17, the other foot portion 18 of the reel support being secured to said handle by a screw clamp 19. (See Figures 2 and 3.)

The offset handle 4 has a rearwardly extending shank 20 to which a grip part or sleeve formed of soft rubber or a phenolic condensation product is applied. This soft rubber handle portion 21 is formed with finger depressions 22 that co-operate with a finger projection 23 on the offset portion 4 of the handle to enable it to be firmly gripped.

Another feature of my invention is the provision for the fishing line, of a guide which is easily and economically secured to the rod so as not to interfere with its bending movement after it is applied thereto. This guide comprises a spring clip 24 having a hump portion 25 that is soldered to the rod 1. The size of this clip will, of course, depend upon its location upon the rod, the clip 15 in Figures 1, 4 and 5 being larger than the clip 26 on the front end of the rod and shown in Figures 1, 6 and 7.

After a spring clip 25 has been soldered to the rod, a banded ring is sprung into, and soldered to, the clip. This banded ring preferably comprises a spring brass ring 27 in which a glass ring 28 is soldered to receive the fishing line 29. These line guides are easily and firmly secured to the rod, and do not interfere with its bending movement through a true arc.

Having described my invention, I claim:

A device of the type described comprising a handle, a socket portion thereon having a bore tapering radially inward at its inner end, axially split clamping jaw portions on the outer end of said socket portion, said jaw portions being externally threaded, a rod having a butt end insertable in said socket portion, the butt end of said rod terminating in a tapering periphery for reception by the tapered end of said bore, a tapering neck on the butt end of said rod, said rod having an annular shoulder at the outer end of said neck portion, and a gland nut adapted to be screwed over the threaded clamping jaws of the handle socket portion, said nut having a tapering outer end to compress said clamping jaws against the tapered neck of the butt portion of the rod, to force it tightly into the tapered rear end of the bore in the handle socket portion when the nut is screwed inwardly, and to engage the shoulder on the rod to force the latter out of the handle socket portion when the nut is screwed outwardly.

MILTON S. DUNKELBERGER.